United States Patent Office 2,813,859
Patented Nov. 19, 1957

2,813,859

HETEROCYCLICS

Jerome Korman, Portage Township, Kalamazoo County, Mich., assignor to The Upjohn Company, Kalamazoo, Mich., a corporation of Michigan No Drawing. Application December 17, 1954, Serial No. 476,081

2 Claims. (Cl. 260—239.5)

This invention relates to novel heterocyclics, more particularly to 2-aminothiazolo-steroids and to a process for their production.

It is an object of the present invention to provide novel 2-aminothiazolo-steroids and their acid addition salts. Another object is the provision of a process for their production. Other objects will be apparent to those skilled in the art to which this invention pertains.

The novel compounds of the present invention possess physiological activity and antimicrobial activity, including anti-fungal and yeast inhibiting activity.

According to the present invention, the novel compounds of the present invention are prepared by the reaction of a steroidal α-haloketone, wherein the halogen substituted carbon atom also bears at least one hydrogen atom with thiourea to produce a 2-aminothiazolo-steroid. This reaction may be represented as follows:

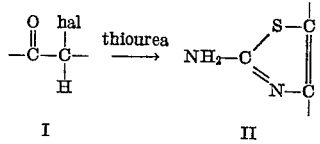

Since steroid α-haloketones as defined above are most frequently 3, 6, 11 or 20 ketosteroids, the above amino thiazolo ring is ordinarily found at the 2,3, 3,4, 6,7, 11,12 or 20,21-position of the steroid molecule.

In carrying out the process of the present invention the thiourea and selected α-haloketosteroid are condensed, in an organic solvent substantially inert to the reactants and in which the thiourea and α-haloketosteroid are at least partially soluble.

The reaction conditions of the present invention are the usual conditions for the preparation of thiazoles as shown by Wiley et al., "Organic Reactions," 367 (Wiley publishers, New York). The preferred solvents are the lower-alkanols, especially ethanol. The preferred reaction temperature is between about forty and 150 degrees centigrade, e. g., between sixty and 100 degrees centigrade. At least a molar equivalent of thiourea is preferably employed. The reaction is preferably performed with all of the reactants in complete solution.

Starting steroids for the process of the present invention are α-halosteroids, more particularly ketosteroids having alpha to the keto group a carbon atom having as substituents both a halogen having an atomic weight from 35 to 127, inclusive, i. e., chlorine, bromine or iodine, and at least one hydrogen atom (I). The preferred starting steroids are the α-bromoketosteroids. Especially preferred are the α-bromo-3-keto and α-bromo-20-keto steroids, i. e., 2-bromo-3-keto, 4-bromo-3-keto, and 21-bromo-20-keto steroids.

In its more limited aspects, the present invention is concerned with the production of 2'-aminothiazolo-[4',5']-cyclopentanopolyhydrophenanthrene steroids wherein the thiazolo ring is attached to the steroid molecule at one of positions 2,3, 3,4, and 20,21 and wherein, as sole additional nuclear substituents, the thiazolo-steroid molecule has at least two of the following: a functional group selected from the group consisting of ketonic oxygen, hydroxy and lower-acyloxy at at least one of positions 3, 11, 17, 20 and 21; not more than three double bonds; a less than three carbon atom side chain; and a 21-function selected from the group consisting of hydroxy, carbonyloxy and lower-acyloxy; and acid addition salts thereof. The preferred compound are those represented by one of the following formulae:

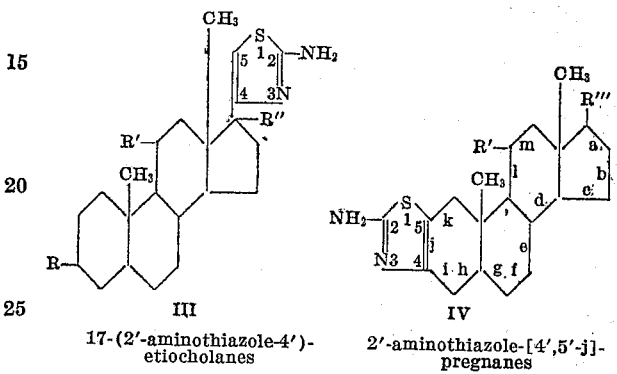

III
17-(2'-aminothiazole-4')-etiocholanes

IV
2'-aminothiazole-[4',5'-j]-pregnanes wherein R is hydroxy, keto or lower-acyloxy; R' is hydrogen, hydroxy, or keto; R" is, for example, hydrogen, hydroxy, methyl, lower-acyloxy, acetoxy; R''' is, for example,

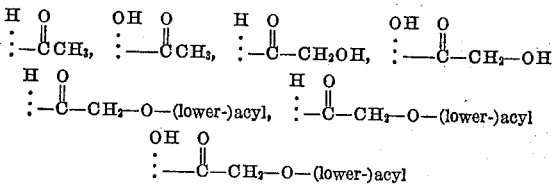

or =CH—COO-(lower-)-alkyl; unsaturated derivatives thereof having not more than two additional double bonds; and acid addition salts thereof.

The compounds represented by Formulae III and IV are prepared from the corresponding α-haloketones, wherein the halogen has an atomic weight from 35 to 127, inclusive. The starting steroid for the production of compounds of Formula III differ from Formula III only in that the thiazolo ring is replaced by a 2-halo-3-keto group. Similarly, the starting steroids for the production of a thiazolesteroid of Formula IV differ from Formula IV only in that the thiazole ring is replaced by a 21-halo-20-keto side chain.

The starting α-haloketosteroids of the present invention (I) are readily prepared according to methods well known in the art, e. g., by halogenation of the steroid alpha to the keto group, by glyoxalation of the steroid alpha to the keto group followed by monohalogenation, e. g., iodination, and reversal of the glyoxalation; by treatment of a hydroxy group with thionyl chloride or bromide or phosphorous pentachloride, by enol acetylation followed by halogenation of the double bond of the enolacetate group, or by other methods known in the art for the introduction of a halogen alpha to a keto group.

Many of the starting α-haloketones are known in the art, e. g., 21-iodopregnenolone, 21-iodoprogesterone, 11α-hydroxy-21-iodoprogesterone, 11-keto-21-iodoprogesterone, 11β-hydroxy-21-iodoprogesterone, 3α-hydroxy-21-iodopregnane-11,20-dione, 2-brominated allopregnane series compounds, 4-brominated normal-pregnane series compounds, 12-brominated-11-ketosteroids, 11-halogenated-12-ketosteroids, 21-chlorinated and brominated normal and allo series 20-ketosteroids, 4-brominated-3-keto-etiocholanes, 2-brominated-3-keto-androstanes, etc.

Examples of compounds of the present invention include 3α- and 3β-hydroxy-17β-(2'-aminothiazole-4')-etiocholane, the 3α- and 3β-hydroxy-17β-(2'-aminothiazole-4')-etiocholane-11-one, the 3α,11β- and 3β,11β-dihydroxy-17β-(2'-aminothiazole-4')-etiocholane, 3α,11α- and 3β,11α-dihydroxy-17β-(2'-aminothiazole-4')-etiocholane; the corresponding acetate esters of the monohydroxy compounds above and the diacetate esters of the dihydroxy compounds above; the corresponding allo-analogues of the above compounds; 17β-(2'-aminothiazole-4')-etiocholane-3-one; 17β-(2'-aminothiazole-4')-etiocholane-3,11-dione; 11α-hydroxy- and 11β-hydroxy-17β-(2'-aminothiazole-4')-etiocholane-3-one; the corresponding 17α-hydroxy analogues of all of the above named compounds; 17-(2'-aminothiazole-4')-4-androstene-3-one; 11α-hydroxy-(2'-aminothiazole-4')-4-androstene-3-one; 11β-hydroxy-(2'-aminothiazole-4')-4-androstene-3-one; 17-(2'-aminothiazole-4')-4-androstene-3,11-dione; the corresponding 17α-hydroxy analogues of the above named androstene compounds; 2'-aminothiazolo-[4',5'-j]-pregnane-17α-ol-21-acetate-11,20-dione; 2'-aminothiazolo-[4',5'-j]-pregnane-17α-ol-21-actate-20-one; 2'-aminothiazolo-[4',5'-j]-pregnane-17α,21-diol-20-one; 2'-aminothiazolo-[4',5'-j]-pregnane-17α-ol-20-one, etc.

Examples of acid addition salts of the compounds of the present invention include those produced from the mineral acids, e. g., hydrochloride, hydrobromide, sulfate, phosphate, nitrate, the fatty acids, e. g., acetate, propionate, and the polyfunctional organic acids, e. g., succinate, citrate, tartrate, etc.

The following examples are illustrative of the process and products of the present invention but are not to be construed as limiting.

*Example 1.—3α,17α-dihydroxy-17-(2'-aminothiazole-4')-etiocholane-11-one and hydrobromide*

A solution of 4.27 grams (0.01 mole) of 3α,17α-dihydroxy-21-bromopregnane-11,20-dione and 0.76 gram (0.01 mole) of thiourea dissolved in fifteen milliliters of 95 percent ethanol was refluxed for sixteen hours. The mixture was cooled and the colorless voluminous precipitate which had formed was separated by filtration, washed with a small amount of 95 percent ethanol and dried. There was thus obtained 3.15 grams of 3α,17α-dihydroxy-17-(2'-aminothiazole-4')-etiocholane-11-one hydrobromide which decomposed above 250 degrees centigrade and had the analysis below.

Calculated for $C_{22}H_{33}BrN_2O_3S$: N, 5.56; S, 6.37; Br, 15.87. Found: N, 5.95; S, 6.99; Br, 16.79.

To a suspension of six grams (six millimoles) of 3α,17α-dihydroxy-17-(2'-aminothiazole-4')-etiocholane-11-one hydrobromide in 35 milliliters of water and 35 milliliters of 95 percent ethanol was added twenty milliliters of an aqueous five percent solution of sodium hydroxide. After the mixture was maintained at about 25 degrees centigrade with occasional swirling for thirty minutes, the solid was filtered and then crystallized from fifty percent aqueous ethanol. There was thus obtained 4.75 grams of 3α,17α-dihydroxy-17-(2'-aminothiazole-4')-etiocholane-11-one melting at 227 to 229 degrees centigrade and which, after recrystallization from 95 percent ethanol, melted at 226.9 to 228.8 degrees centigrade, had an $[\alpha]_D$ of plus 58 degrees in acetone and the analysis below.

Calculated for $C_{22}H_{32}N_2O_3S$: N, 6.93; S, 7.92. Found: N, 6.81; S, 7.61.

*Example 2.—Methyl 2'-aminothiazolo-[4',5'-j]-11-keto-2,4,17(20)-pregnatriene-21-oate*

A mixture of 4.37 grams (0.01 mole) of methyl 2-bromo-3,11-diketo-4,17(20)-pregnadiene-21-oate and 0.76 gram (0.01 mole) of thiourea in seventy milliliters of 95 percent ethanol refluxed for seven hours. The cooled solution was filtered to remove the precipitated solid which was then washed with 95 percent ethanol. There was thus obtained methyl 2'-aminothiazolo-[4',5'-j]-11-keto-2,4,17(20)-pregnatriene-21-oate hydrobromide.

The thus obtained hydrobromide was suspended in water and treated with a five percent aqueous solution of sodium hydroxide as in Example 1. The solid, after thirty minutes of mixing, was separated by filtration and then crystallized twice from ethanol. After the second crystallization, there was obtained one gram of methyl 2'-aminothiazolo-[4',5'-j]-11-keto-2,4,17(20)-pregnatriene-21-oate melting at 226 to 228 degrees centigrade, having an $[\alpha]_D$ of plus 150 degrees in chloroform and the analysis below.

Calculated for $C_{23}H_{28}N_2O_3S$: N, 6.79; S, 7.77. Found: N, 6.69; S, 7.51.

Following the procedure described in Example 2, other lower-alkyl esters of 2'-aminothiazolo-[4',5'-j]-11-keto-2,4,17(20)-pregnadiene-21-oic acid are prepared by substituting the corresponding lower-alkyl ester of 2-bromo-3,11-diketo-4,17(20)-pregnadiene-21-oic acid as the starting steroid in the reaction described in Example 2.

The starting methyl 2-bromo-3,11-diketo-4,17(20)-pregnadiene-21-oate can be prepared by reacting 11-keto-progesterone with 2.75 molar equivalents of sodium methoxide and 3.5 molar equivalents of diethyl oxalate in tertiary butyl alcohol at fifty degrees, neutralizing the mixture with acetic acid, adding three molar equivalents of bromine at zero degrees centigrade and then adding an excess of sodium methoxide and methanol at room temperature. The preparation of methyl 2-bromo-3,11-diketo-4,17(20)-pregnadiene-21-oate as well as other lower-alkyl esters, is disclosed in the copending application of Hogg et al., Serial No. 346,274, filed April 1, 1953, now Patent No. 2,774,776, issued December 18, 1956.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. Lower-alkyl 2'-aminothiazolo-[4',5'-j]-11-keto-2,4,17(20)-pregnatriene-21-oate.

2. Methyl 2'-aminothiazolo-[4',5'-j]-11-keto-2,4,17(20)-pregnatriene-21-oate.

No references cited.